United States Patent
Morales et al.

(10) Patent No.: US 6,932,305 B2
(45) Date of Patent: Aug. 23, 2005

(54) CAMERA SUPPORT AND CONTROL DEVICE

(76) Inventors: Enrique Morales, 1685 Sunset Plaza Dr., Los Angeles, CA (US) 90069; Douglas Miller, 821 1/2 Crestmore Ave., Venice, CA (US) 90291

( * ) Notice: Subject to any disclaimer, the term of this patent is extended or adjusted under 35 U.S.C. 154(b) by 0 days.

(21) Appl. No.: 10/640,711

(22) Filed: Aug. 13, 2003

(65) Prior Publication Data

US 2005/0035245 A1 Feb. 17, 2005

(51) Int. Cl.[7] .............................................. F16M 11/06
(52) U.S. Cl. ............................... 248/187.1; 248/183.1; 248/125.2; 396/428
(58) Field of Search ...................... 248/125.2, 125.8, 248/125.9, 187.1, 183.1, 183.2, 184.1, 178.1; 396/419, 427, 428

(56) References Cited

U.S. PATENT DOCUMENTS

| | | | | |
|---|---|---|---|---|
| 1,006,834 A | * | 10/1911 | Edwards | 211/47 |
| 3,822,051 A | * | 7/1974 | Karapita | 248/333 |
| 3,940,139 A | * | 2/1976 | Barnes | 473/494 |
| 4,934,647 A | * | 6/1990 | Edwards | 248/371 |
| 5,786,854 A | * | 7/1998 | Slade et al. | 348/373 |
| 2003/0161622 A1 | * | 8/2003 | Zantos | 396/419 |

FOREIGN PATENT DOCUMENTS

JP          405119392 A  *  5/1993  ................. 396/419

* cited by examiner

*Primary Examiner*—Jonathon Szumny
(74) *Attorney, Agent, or Firm*—Lawrence S. Cohen

(57) ABSTRACT

An extensible camera mast in which the tilt of a camera placed at the top of the mast is controlled by a pair of lines that extend from a tilt assembly on which the camera is mounted down to a control assembly where the lines are wound on oppositely rotatable spools so that one line is taken up as the other is released.

21 Claims, 12 Drawing Sheets

CAMERA SUPPORT AND CONTROL DEVICE

FIELD OF THE INVENTION

This invention relates to apparatus for supporting and controlling a camera, in particular such a device in which the camera is mounted at the top of an extensible mast and can be pivoted in a controlled manner about a horizontal axis by means of a control mechanism near a lower end that is operated by an operator and in which the camera can also be pivoted about a vertical axis.

BACKGROUND

Cameras especially video cameras are typically mounted in a heavy, expensive support carriage that provides numerous features and convenience. Such support mechanisms as are used in the video taping and broadcast of sporting events are well known. In a typical sporting event such as a football game or a soccer game or other field sport several cameras are used. These are typically very expensive cameras and they are carried on expensive carriages. In such events particularly for commercial taping and broadcast many cameras are used some on the ground level, others in the viewing stands and still others in complex "skycam" rigs. Typical of such rigs are of the jib arm and crane type that require a counterbalancing element. Even when the jib arm is mounted on a tripod, a counterbalance is needed in order to allow convenience of use.

Recently as camera technology has advanced good quality cameras are available that cost a lot less than the professional cameras used for major sporting events. Even at such events the new lightweight and easily carried cameras are used for "roving" features such as spot interviews and the like. For convenience these cameras can be called "prosumer" products because they combine features of professional cameras with the cost and convenience of consumer cameras.

As is well known there is a world of sports at which professional broadcast recording is absent, but in this world there is still a desire to record the event. Such events as high school sports are a prime example. There is a need to be able to provide professional level taping and broadcast of such events. While it is true that a person or several persons with consumer video cameras could accomplish taping and then producing a fully recorded event, the need is for a professional level of endeavor. With a good professional recording of the event parents and others can find it desirable to buy a tape, disc, or other media recording of the event for their personal enjoyment. This then predicts a business in the recording of such events, which are not recorded by the major recording companies. For such a business there is a need for professional level equipment in terms of utility but at a cost that can be tolerated for the economics involved. One such piece of equipment is a device to elevate a camera to enable it to record events from a desired height and also to be able to rotate the device around a vertical axis to change its view and also to pivot the camera on a horizontal axis to be able to look near and far away as desired. This type of flexibility in the hands of a skilled camera operator can help to produce a saleable product at events where in the past it was simply prohibitive to consider quality recording. For example a high school soccer game can be recorded and edited on site and a CD-ROM offered for sale to parents, coaches, etc. There is a need for the capability to record such an event and prepare on site a product to sell.

The present invention is for a device that can provide the economical simple and easily used device for such purposes.

SUMMARY OF THE INVENTION

The invention comprises a camera support and control apparatus having an extensible mast at the top of which is a control response assembly in which a horizontal pivot axis is defined and having a tilt plate mounted for pivoting on the horizontal axis and a rotator member for controlling rotation of the tilt plate and lower on the mast for access by a user, a control assembly having rotatable spools on which are oppositely wound a pair of lines, the lines extending to spaced apart positions on the rotator member on opposite sides of the pivot axis so that when one line is pulled by winding it on the spool rotation in one direction takes place, while the other is allowed to unwind, and vise versa for rotation in the opposite direction. With this apparatus, a camera mounted on the tilt plate can be controllably tilted about the horizontal tilt axis.

Further description of the invention can be seen in the claims.

DETAILED DESCRIPTION

The present invention provides a camera support and control apparatus that is one-person portable and provides for elevating and controlling a camera without the need for any counterbalancing apparatus. The invention allows the camera to be tilted in a vertical plane about a horizontal axis and the apparatus is pivotable about a vertical axis.

Figure 1:
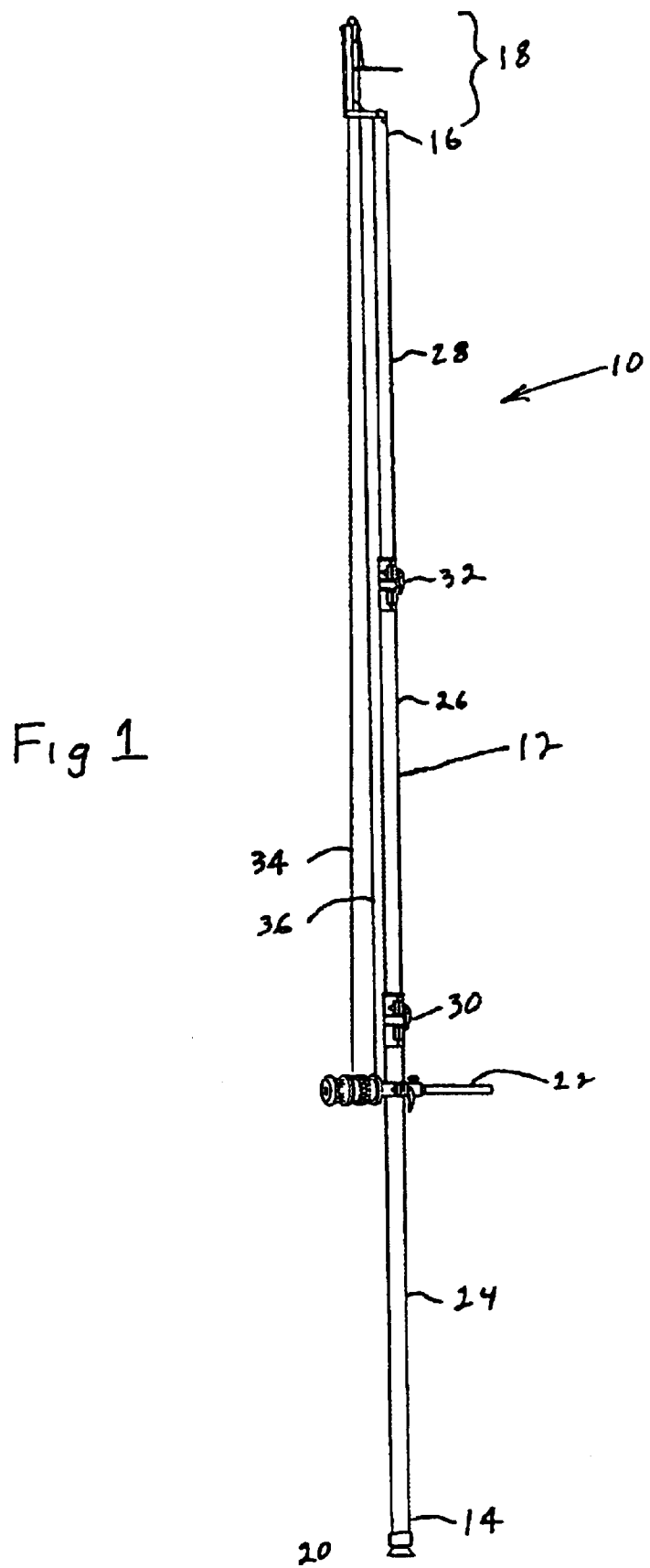
FIG. 1 is the invention as assembled ready for use.
Figure 2:
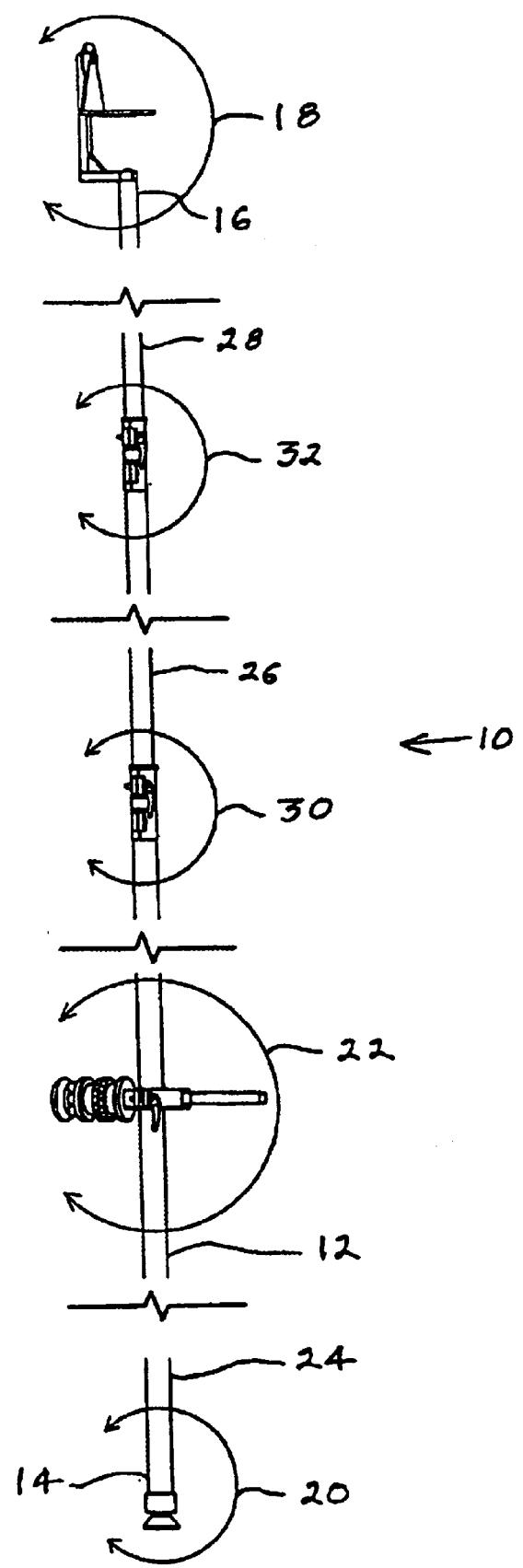
FIG. 2 is an enlarged broken view of the invention as assembled ready for use.

A preferred embodiment of the invention is shown in FIGS. 1 and 2 in which the camera support and control device 10 has an extensible mast 12, having a bottom end 14, and a top end 16. Located at the top end 16 is a camera mounting and control response assembly 18. Located at the bottom end is a pivoting foot assembly 20. Located at a convenient operating position for a person to operate the device is a control assembly 22. The extensible mast 12 is made up of a number of telescoping sections from the lowest mast section 24, then to a second and intermediate mast section 26 and finally to a third and upper mast section 28. The number and length of telescoping sections is a matter of choice. Each mast collapses into the one below into a travel configuration, and in use they are extended to the desired height. In the embodiment shown three sections are shown. A releasable collar assembly 30 is fixed to the top of the lowest section 24 and another releasable collar assembly 32 is fixed to the top of the second section 26. Lines 34 and 36 (FIG. 1 only) extend between the camera mounting and control response assembly 18 and the control assembly 22. The term "line" as used herein is intended to include any line or rope or the like that will work for the purpose described herein. The use a braided pre-stretched rope such as Brite Lite Spectra Braid is suitable.

Figure 3A:
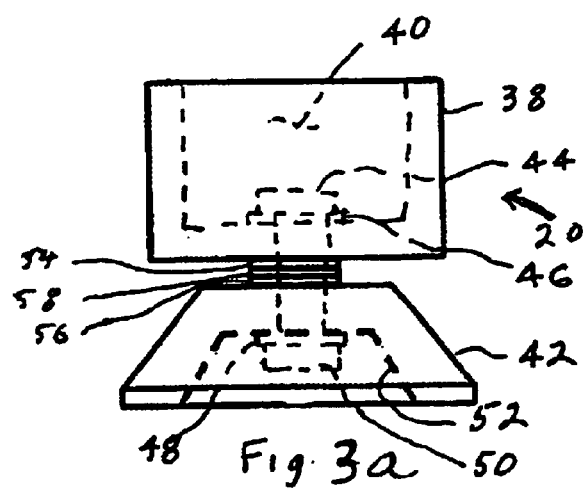
FIG. 3a is a side view of the foot assembly.
Figure 3B:
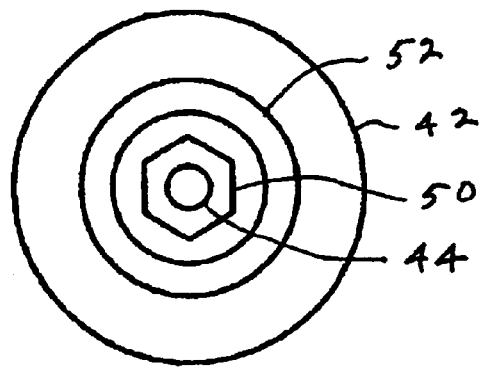
FIG. 3b is a bottom view of the foot assembly.
Figure 3C:
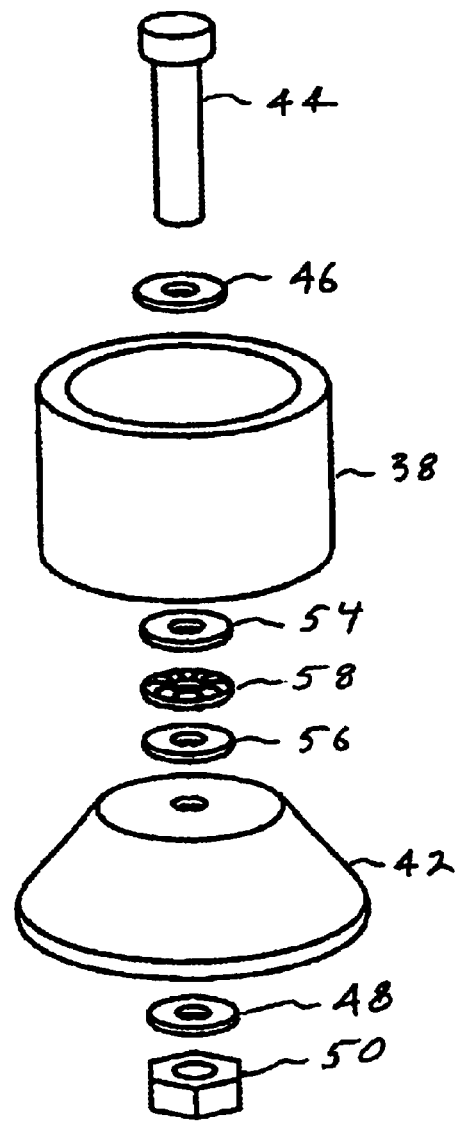
FIG. 3c is an exploded perspective view of the foot assembly.

FIGS. 3a, 3b and 3c are the detail of the pivoting foot assembly 20. A cup 38 has an opening 40 in which to receive the lower terminal end of the lowest mast section 24 (not shown). It may be secured in place by any selected means such as setscrews, bolts, or welding. A rubber (or plastic) footpad 42 resides below the cup 38. The cup 38 and the footpad 42 are mutually pivotable, which can be accomplished by various means. The means shown is a bolt 44 mounting a washer 46 that extends through a hole in the cup 38 and through a hole in the foot pad 42, being secured by a washer 48 and a nut 50 which reside in a recess 52 in the foot pad 42. To provide smooth pivoting, between the cup 38 and the footpad 42 is an assembly of a washer 54, a washer 56, and between them a thrust bearing 58. It is a feature of the invention that the flexibility of use is enhanced by the absence of a supporting base. Thus the foot assembly 20 is small, close in size to the mast diameter so that while it provides for pivoting the masts, the operator retains the ability to keep the whole apparatus upright (or tilted if desired) and to rotate it as desired. The foot assembly could be equipped with a gimbaled bearing to allow several degrees of freedom for both rotating and tilting.

Figure 4:
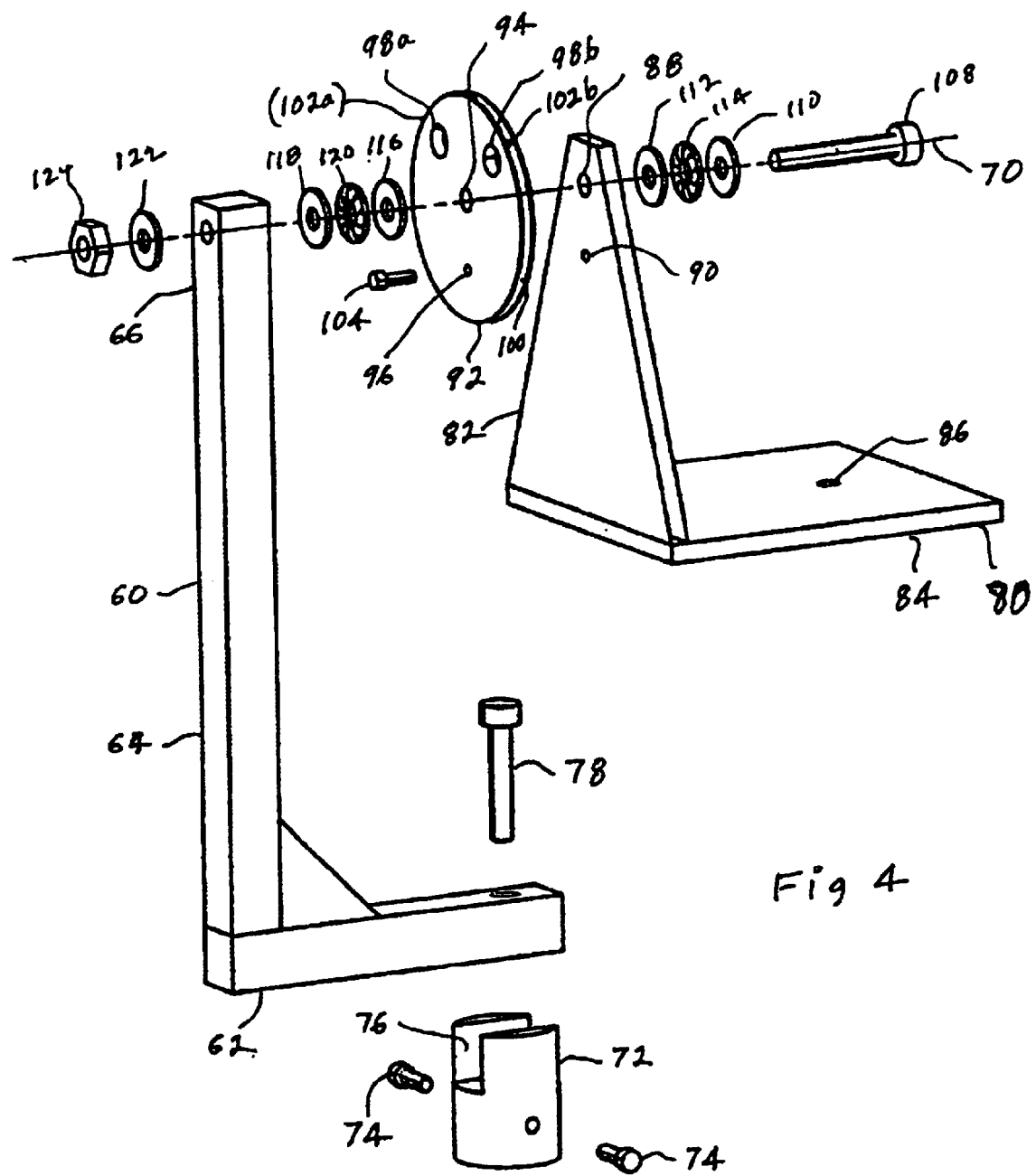
FIG. 4 is an exploded perspective view of the control response assembly.
Figure 5:
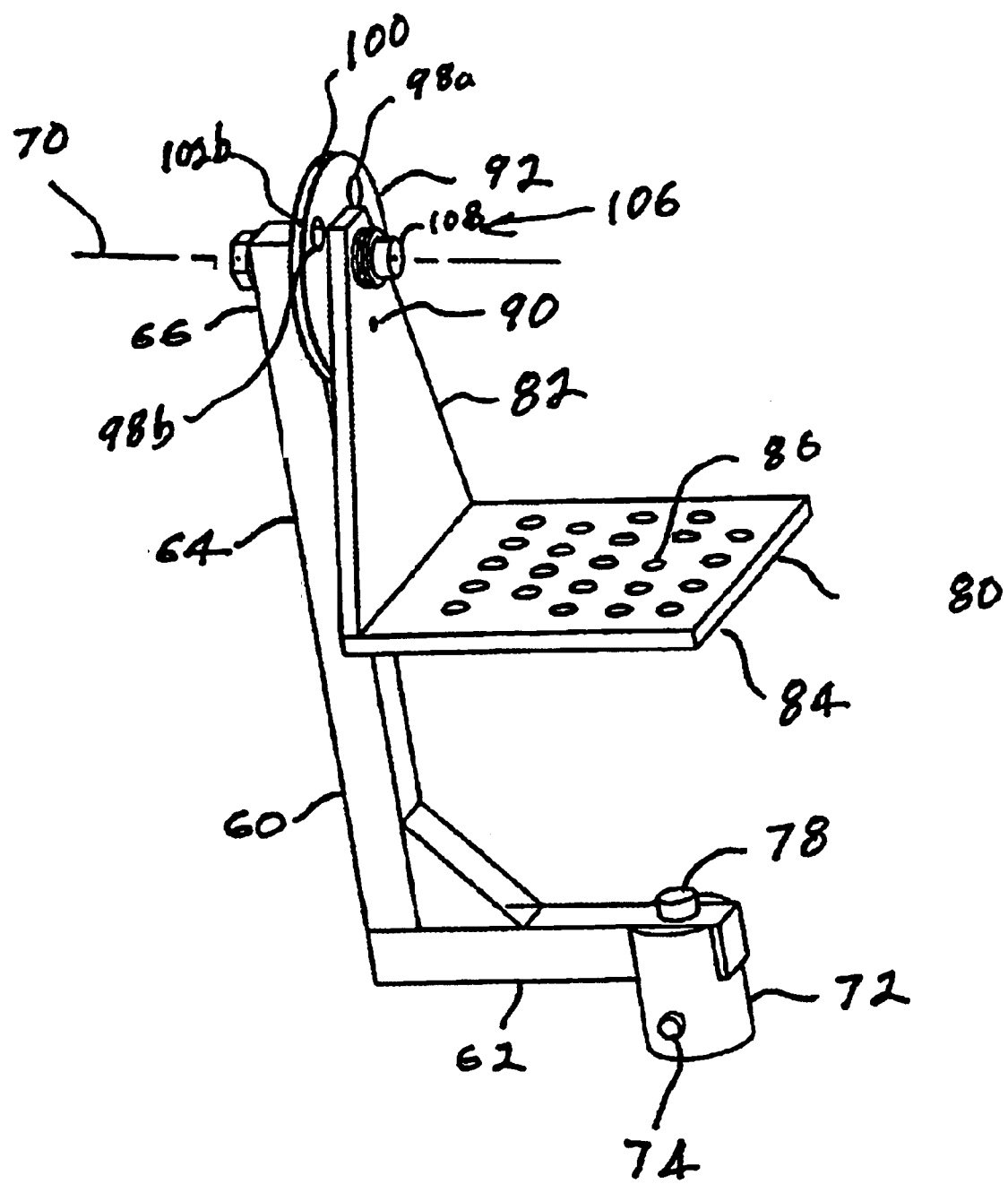
FIG. 5 is a perspective view of the control response assembly.
Figure 7:
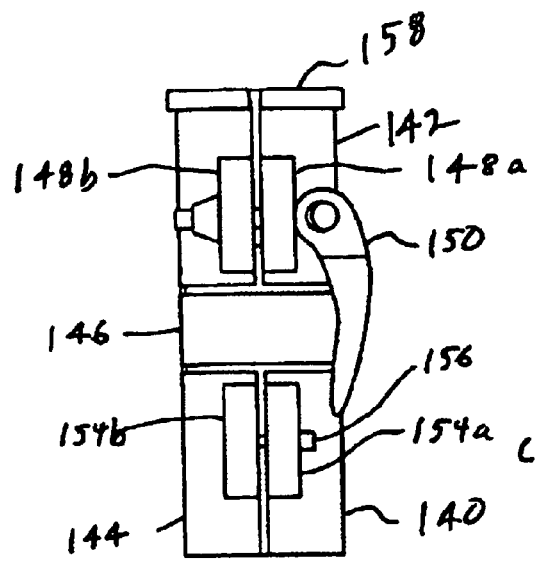
FIG. 7 is a front view of the releasable collar assembly.
Figure 8:
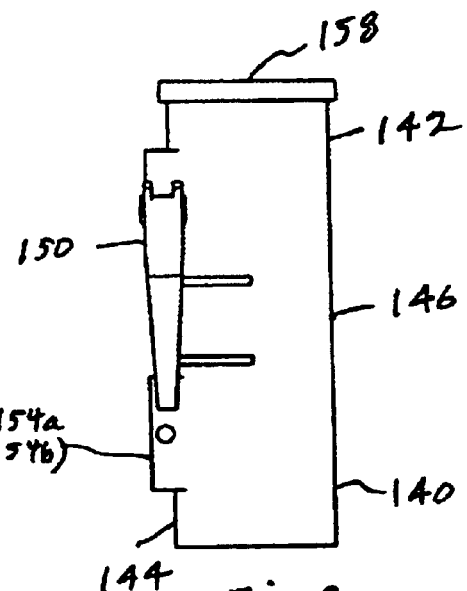
FIG. 8 is a side view of the releasable collar assembly.
Figure 9:
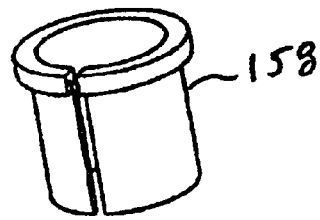
FIG. 9 is a top view of the releasable collar assembly.
Figure 6:
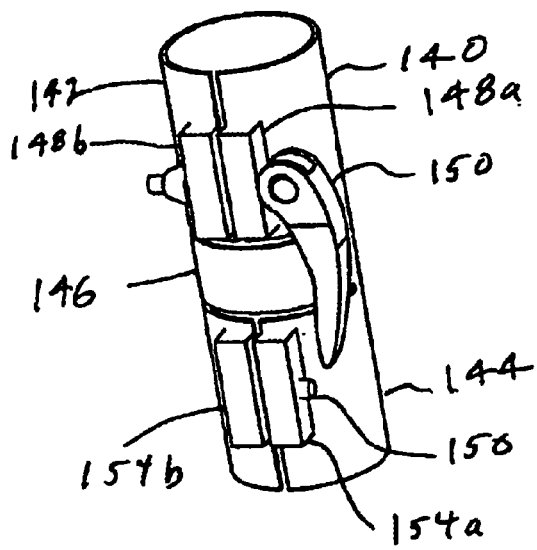
FIG. 6 is an exploded perspective view of the releasable collar assembly.
Figure 15:
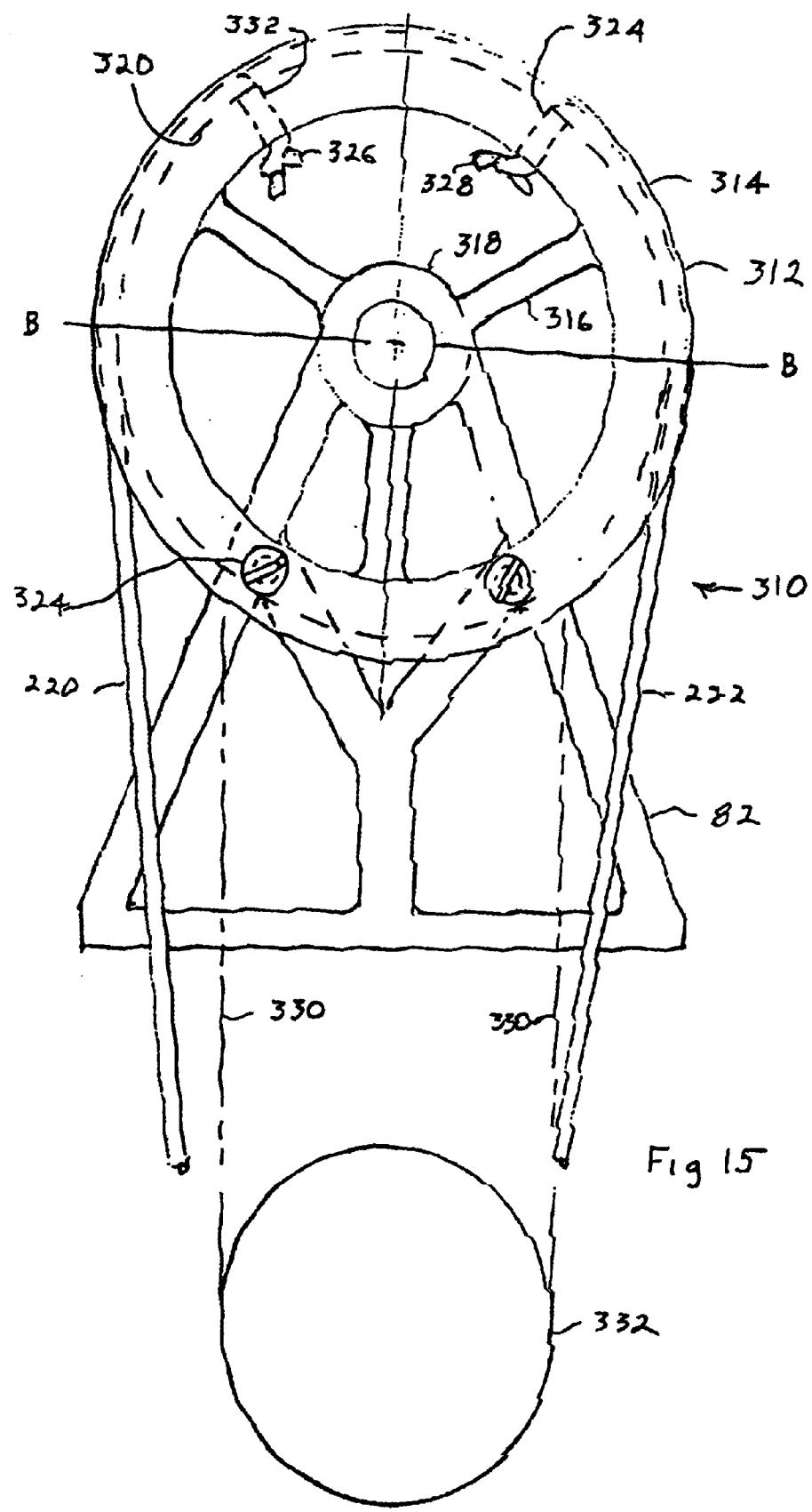
FIG. 15 is a partial view of a further evolved embodiment and a partial diagrammatic view of the lines and the spools.

FIG. 4 is an exploded view of the control response assembly 18 and FIG. 5 is a perspective view (a more fully developed but partial view is shown in FIG. 15). A yoke 60 has a base member 62 and an upright member 64, which has near its upper end 66 a hole 68 defining a pivot axis 70. The yoke 60 is attached to the top of the upper mast section 28 by inserting a mounting spud 72 into the upper mast section 28 (not shown) which may be secured by attaching screws 74 through holes in the mast section 28 into threaded holes in the mounting spud 72 or by other securing means such as by a press or interference fit, or by welding. An upper portion of the mounting spud 72 is fitted to extend beyond the end of the upper mast section 28 leaving access to a slot 76 dimensioned to receive the base member 62 of the yoke 60 which is then fastened in place with a bolt 78.

Also referring to FIGS. 4 and 5, a tilt plate 80 has an upright member 82 and a base member 84 which is a camera support element. The tilt plate 80 will have a camera mounted on it as will be more fully described below. An array of holes 86 is provided in order to accommodate mounting various cameras and lens configurations. With a camera fitted by a bolt through a selected hole, the tilt plate 80 should have a natural rest position such that in the rest position the camera lens axis is at or near horizontal. The center of gravity of the tilt plate 80 with a camera attached should be below the axis 70 so as to create the rest position. With this configuration, as will be understood later, the tilt plate and thus the camera on it can with equal ease be tilted up or down. In special circumstances, if tilting up or tilting down is a dominant or exclusive mode of use the camera itself can be tilted or the line set up can be biased or the camera can be mounted on a hole 86 that establishes a desired tilt. The upright member 82 has a hole 88 near its upper end and below the hole 88 a threaded hole 90. A pulley wheel 92 has a central hole 94 and below it another hole 96 and above and aligned with each other there are spaced apart openings 98a and 98b. The pulley wheel 92 has a groove 100 and in the groove 100 near each of the holes 98a and 98b are holes 102a and 102b that extend from the groove 100 to the openings 98a and 98b respectively. When the pulley wheel 92 is fitted adjacent the upright member 82, with the central hole 94 aligned with the hole 88 on axis 70, the hole 96 will be aligned with the threaded hole 90. To assemble the control response assembly 18, the pulley wheel 92 is placed adjacent the upright member 82 and attached by a threaded screw 104 through the hole 96 into the threaded hole 90 to define a sub-assembly, a tilt assembly 106 comprised of the tilt plate 80 and the pulley wheel 92. The tilt assembly 106 is mounted on the upright member 64 with a suitable bearing assembly to enable it to pivot on the pivot axis 70; the design of such a bearing assembly is considered within the ordinary skill of a designer. In the present embodiment, to assemble the tilt assembly 106 for pivoting on the upright member 64 there is a bolt 108. A pair of washers 110 and 112 and between them a thrust bearing 114 are fitted on the bolt 108 on the outside (to the right in FIG. 3) of the upright member 80 and a second such set, washers 116 and 118 between which is a thrust bearing 120 fitted on the outside of the pulley wheel 92, between the pulley wheel 92 and the upright member 66. Then with the bolt 108 fitted through the upright member 82 and held securely by a washer 122 and a nut 124, the tilt assembly 106 is pivotable on the upright member 82. The base member 84 of the tilt plate 80 is sufficiently below the pivot axis 70, around which the pivoting structure 106 can pivot, such that the tilt assembly 106 will tend to take a rest position with the base member 84 below the pivot axis 70 as shown in the figures. Even with a camera resting on the base member 84, the upright member 82 is fabricated to extend sufficiently below the pivot axis 70 that the weight with a camera installed will cause the tilt assembly 106 to have a rest position approximately as shown so that the camera will be approximately horizontal (or biased as desired). As will be appreciated, it is not necessary that the base member's 84 rest position be exactly horizontal and in fact since cameras vary, such as with a long lens, there may be a tilt at rest, but the center of gravity must be below the pivot axis 70 in order to establish a rest position and to allow controlled tilt by tension alone on the lines as will be described below.

When the mast members are in the erected position a locking device is employed to keep them there. Referring to FIGS. 6, 7, 8, and 9, the releasable collar assemblies 30 and 32 have a collar body 140. The collar body 140 has a split upper portion 142 and a split lower portion 144 with a central portion 146 that is not split. Parallel blocks 148a and 148b are on each side of the split in the upper portion 142. Installed across the blocks 143a and 148b is a cam lock assembly 150. On the lower portion 144 there is also a set of blocks 154a and 154b, block 154a having a clear hole through it and block 154b having a threaded hole in it so that a bolt 156 can be inserted and tightened. A split plastic sleeve 158 fits inside the split upper portion 142. With appropriate dimensioning the collar assemblies 30 and 32 can be the same, with enough range for tightening to fit in both places. The collar assembly 30 is assembled to the lower mast section 24 by the split lower portion 144 being placed over the upper end of the mast section 24 and the bolt 156 tightened to hold it firmly in place. Similarly the collar assembly 32 is attached to the upper end of the mast section 26. Referring to both of the collar assemblies 30 and 32, then the next upper mast section that has a reduced diameter to fit inside the mast section below it is fitted. When the next upper mast section is to be extended it is raised to the desired height and then the cam lock assembly 150, which is in its open position, is tightened to grip the next upper section and keep it extended.

Figure 10:
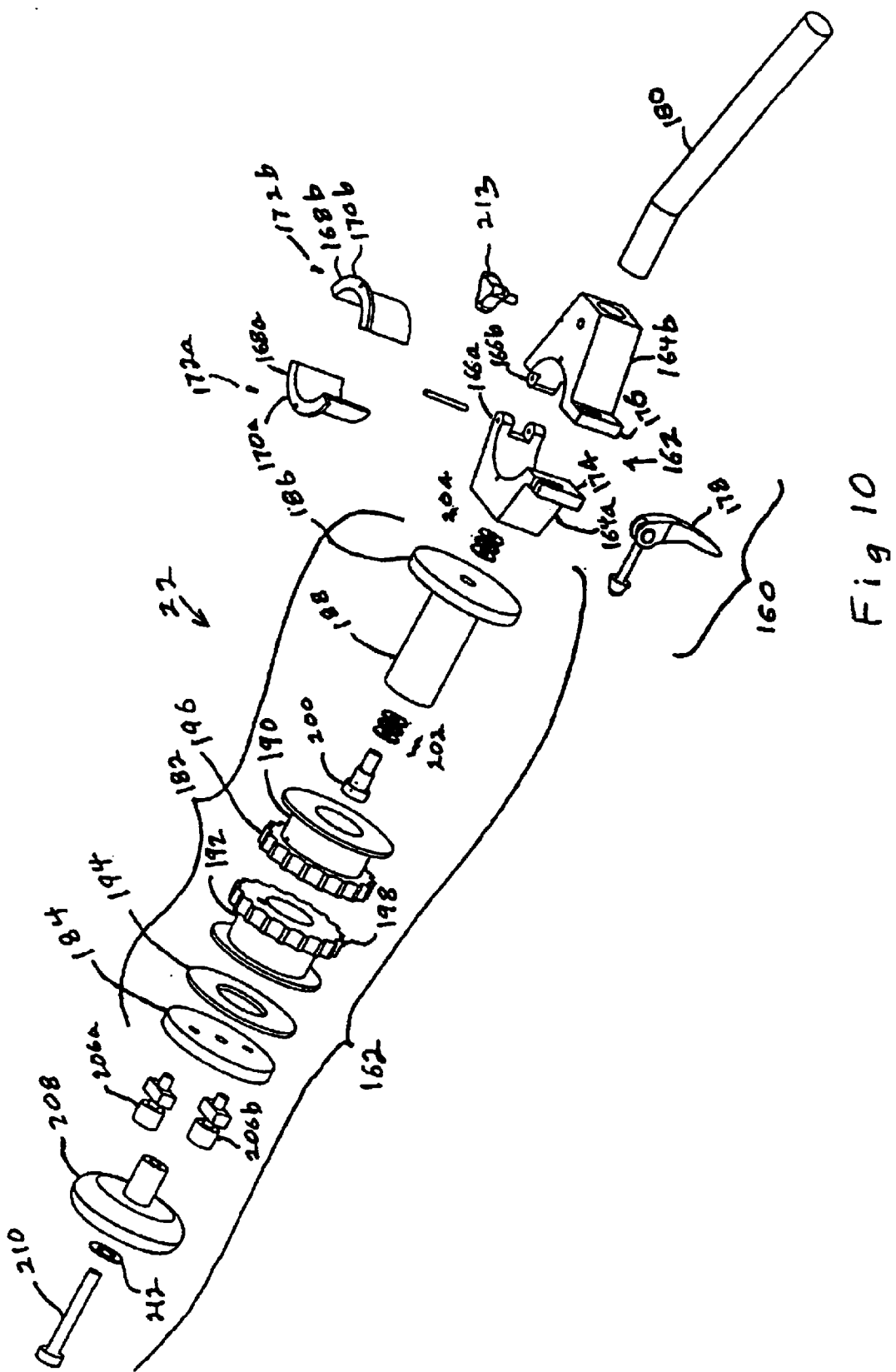
FIG. 10 is an exploded perspective view of the control assembly.
Figure 12:
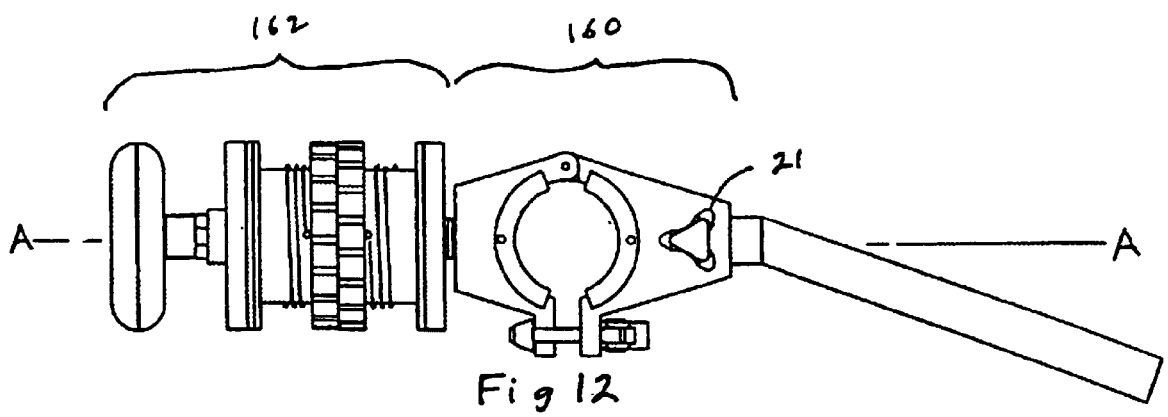
FIG. 12 is a top view of the control assembly.
Figure 11:
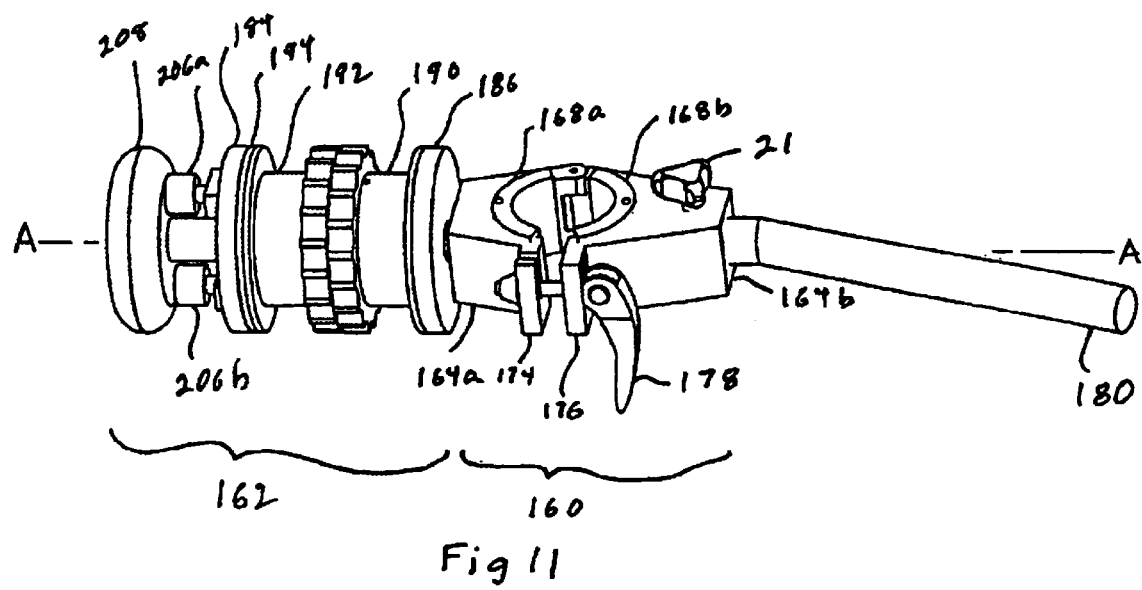
FIG. 11 is a perspective view of the control assembly.

Referring to FIGS. 10, 11, and 12 the control assembly 22 is seen in detail. It has two sub assemblies, a mounting assembly 160 for mounting it on the mast and a control operating assembly 162 for controlling the tilt of the tilt assembly 106. The mounting assembly 160 has an adjustment collar 162 made up of two pieces 164a and 164b that are mutually pivotable by hinges 166a and 166b respectively. Inside each of the two pieces 164a and 164b of the adjustment collar 162 are plastic sleeves 168a and 168b each having a rim 170a and 170b so that they can be screwed down to the respective pieces of the collar 162 by screws 172a and 172b. The pivoting pieces 164a and 164b have blocks 174 and 176 so that a cam lock assembly 178 can be used to tighten it onto the mast section 24. Also the mounting assembly 160 has a support handle 180 for easily rotating the entire mast about its vertical axis and to facilitate keeping it upright. Also as seen in FIG. 15, a control box 242 is fitted on the support handle 180.

The control operating assembly 162 has a spool core assembly 182 having a first spool core end cap 184 and spaced from the first spool core end cap 184, a second spool core end cap 186, which is integral with a spool core 188. Rotatably assembled on the spool core 188 are a first spool 190 and a second spool 192. Adjacent the second spool 192 is a metal disc brake 194 and on the opposite side of the metal disc brake 194 is the first spool core end cap 184. The first spool 190 has an adjusting rim 196 and the second spool 192 has an adjusting rim 198. These are mounted adjacent each other and are shaped to be easily operated by hand or fingers to rotate their respective spools. The adjusting rims 196 and 198 may also be mounted spaced apart by mounting one or both of the spools 190 and 192 oppositely on the spool core 188. The spool core 188 is rotatably mounted on the mounting assembly 160 by means of a bearing 200 that is fixed to the mounting assembly 160 so that the core is rotatable on the bearing 200. Washer and thrust bearing sets 202 and 204 enable easy rotation. Mounted on the first spool core end cap 184 are two threaded locking mechanisms 206a and 206b that are screwed on to the first spool core end cap 184 and bear against the metal disc brake 194. The spools 190 and 192 are rotatably mounted on the spool core 188. A tilt handle 208 is mounted to the spool core assembly 182 by a mount bolt 210 and washer 212 into a threaded hole 183 in the first spool core end cap 184. A thumbscrew 213 enables adjustment of the support handle 180, which has an off-axis bend in it. The entire control handle assembly 22 is mounted on an axis A—A so that the spools 192 and 190 are rotatable about the axis A—A.

Figure 13:
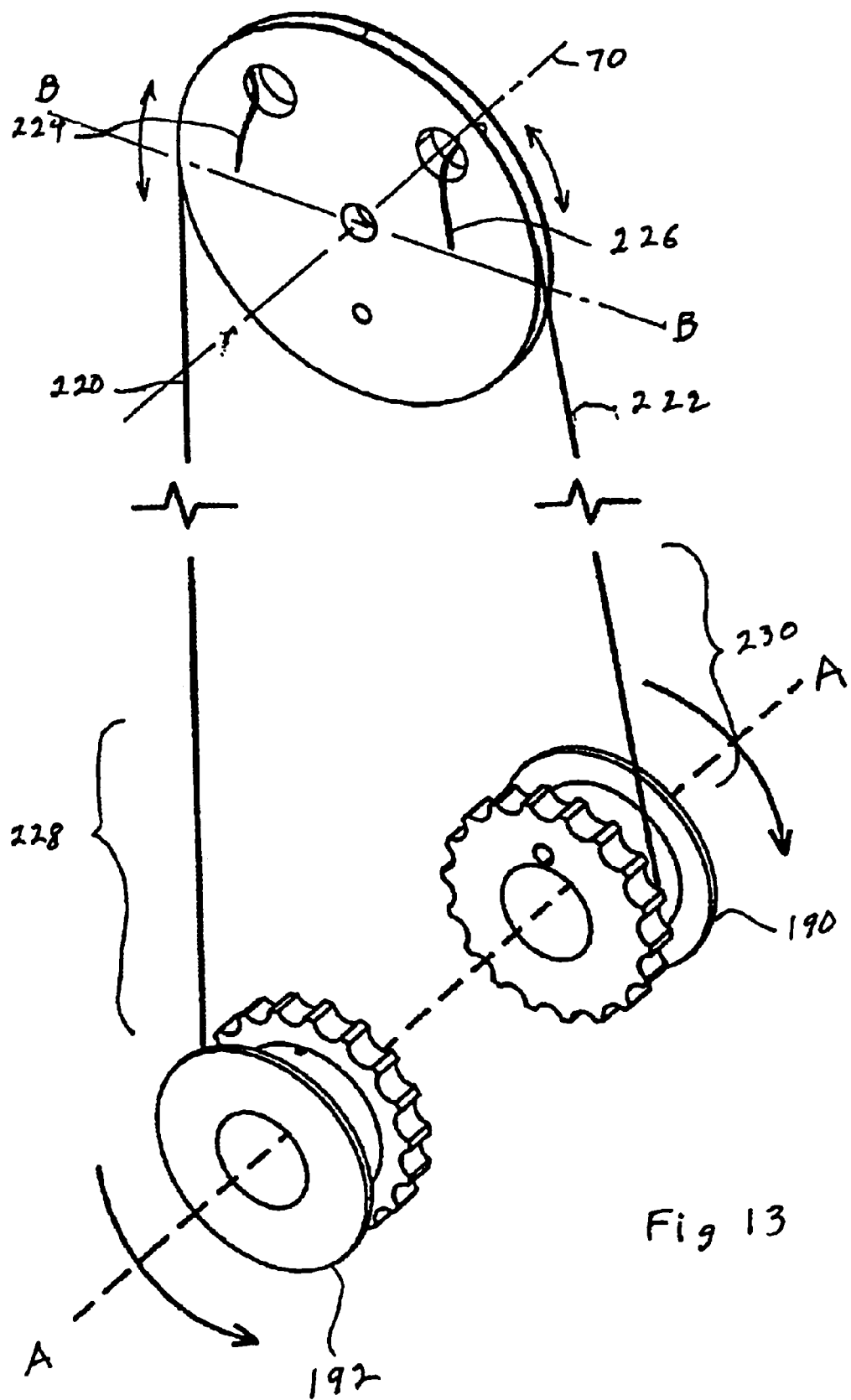
FIG. 13 is a partially diagrammatic view of the lines as they are attached to the spools at one end and the pulley wheel at the other end

Now referring to FIG. 13, extending from the pulley wheel 92 are a first line 220 (the same as line 34 in FIG. 1) and a second line 222 (the same as line 36 in FIG. 1). The first line 220 has an upper end 224 securely fixed to the pulley wheel 92 by running it through the hole 102a and into and out of the hole 98. A crimp or knot (not shown) is applied to the upper end 224 and preferably the crimp is pressed securely into the hole 98a. Similarly the second line 222 has an upper end 226 that extends through the hole 102b into and out of the hole 98b and is similarly crimped or knotted securely in place. Any other well known means for securing the upper ends 224 and 226 in place could be used such as screws, eye bolts, etc so long as the lines ride in the pulley groove 100. The first line 220 has a lower end length 228 and the second line 222 has a lower end length 230. These are attached to and windable on the spools 192 and 190 respectively, each having a sufficient length wound onto the spool to allow operation as described below. The lines are oppositely wound, one clockwise and the other counter-clockwise.

Before use, in the stored and travel position the telescoping mast sections are contracted, and the lines 220 and 222 are wound onto the spools 192 and 190. It is also preferable to tighten the collar assemblies 30 for travel. To place apparatus into operation, the locking mechanisms 206a and 206b are backed off to release the disc brake 194. This releases the spools 190 and 192 for independent rotation so that as the masts are extended the spools unwind and the lines 220 and 222 are released as the masts are extended. The camera is attached at any convenient time in the process. After the masts reach the desired extension, the collar assemblies are tightened. Also the spools 190 and 192 are adjusted by hand, using the rims 196 and 198, to a snug tension of the lines for operation. Then the locking mechanisms 206a and 206b are tightened to lock the spools 190 and 192 for rotation with the spool core 188. In this state the spools 190 and 192 are rotated by use of the tilt handle 208. They rotate together, but as they are oppositely wound, one unwinds while the other winds.

Now the mast is ready for camera operation. To tilt the camera in a selected direction, up or down, the tilt handle 208 is rotated. One of the spools will be in tension and will pull the line on it thereby pulling the rotator member in the, the pulley wheel 92 in the preferred embodiment thereby tilting the tilt assembly 106 and the camera on it. As the spool in tension is winds, the other spool unwinds.

At the top of the mast the pulley wheel 92 responds by rotating in the direction of the line that is being shortened, thereby tilting the tilt assembly 106 about the tilt axis 70.

The particular embodiment described above in which the pulley wheel 92 operates the tilt assembly 106 has a particular special advantage in that it is rotated by a force applied on or near its horizontal diameter B—B (as shown in FIGS. 12 and 13, which is the point of greatest mechanical advantage, and it allows the force for pulling on the line and amount of take-up of the line to be constant as the tilt assembly is tilted.

Figure 14:
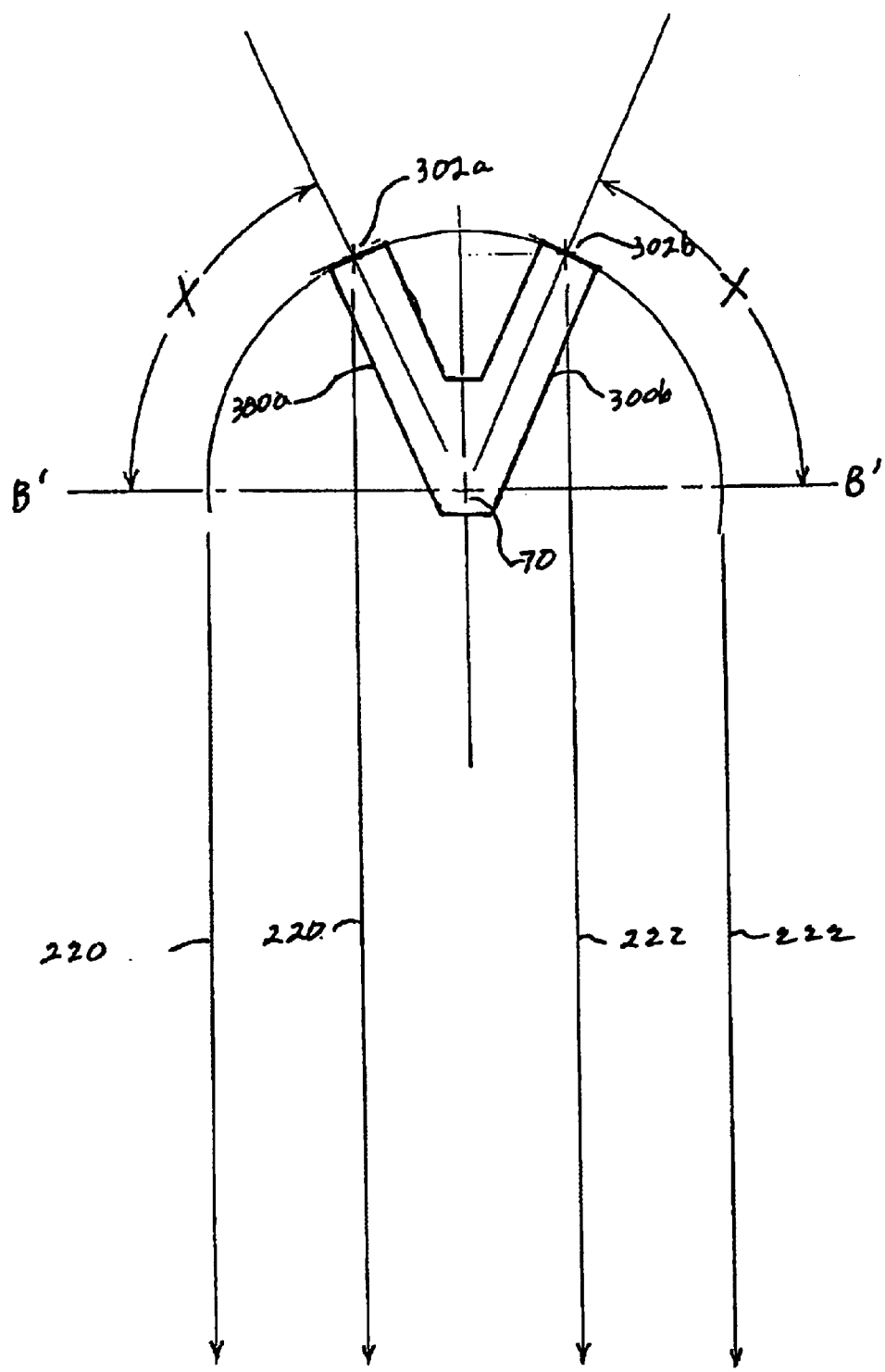
FIG. 14 is a diagrammatic view of an alternative embodiment of the invention.

This can be even more appreciated when an alternative embodiment as shown in FIG. 14 is understood. Referring to FIG. 14, the rotator member is a pair of lever arms 300a and 300b that are fixed together extending upwardly at an angle X to the horizontal fitted to rotate about the pivot axis 70. The lines 290 and 222 are attached at points 302a and 302b. To rotate the lever 30 arms from angle X to the horizontal axis B'—B' requires first a greater amount of force since the mechanical advantage is least and less force as the lever arm rotates toward the horizontal position at B'—B' (the preferred convergence of the lines 220 and 222 toward the smaller diameter around the spools 190 and 192 should be appreciated although it is not shown in FIG. 14). Also the amount of line pulled per amount of rotation changes as the angle changes. While this lever arm construction works well it lacks the particular advantages of the pulley wheel construction. Nevertheless the lever arm system has its own particular advantages. It is simple in construction and could be fashioned as part of the upright member 82 and it does not require that the line stay in a pulley groove.

A further evolution of the preferred embodiment is shown in FIG. 15. In this embodiment the tilt assembly 310 has a pulley wheel 312 constructed of a rim 314 and spokes 316 and a hub 318. It has a groove 320 and holes 322 from the groove to the inside of the rim 314. The pulley wheel 312 is fixed to the tilt plate 80 (upright member 82) by screws 324. Lines 220 and 222 are fixed to the pulley wheel by knots 326 and 328. The lines 220 and 222 are shown as converging to illustrate the mechanical advantage provided due to the diameter of the pulley wheel 312 being greater than the diameter of the spools 109 and 192 (taking into account that the lines are wound on the spools and therefore have a larger and somewhat variable diameter than the spools themselves). A mechanical advantage of about 2:1 is very good and a diameter of 6 inches for the pulley wheel is practical. Also shown in FIG. 15, schematically is the limit of tilt available. Much of the tilt occurs by rotation of the securing point of the lines in the holes 322 and 324 toward the horizontal axis B—B; this tilt range having the maximum mechanical advantage. However the tilt can be continued beyond line B—B albeit with the need for greater force until the lines extend straight out of the holes 322 and 324. This is illustrated approximately by the phantom lines 330 and the circle 332 representing the spooled line on the spools 190 and 192.

Figure 16:
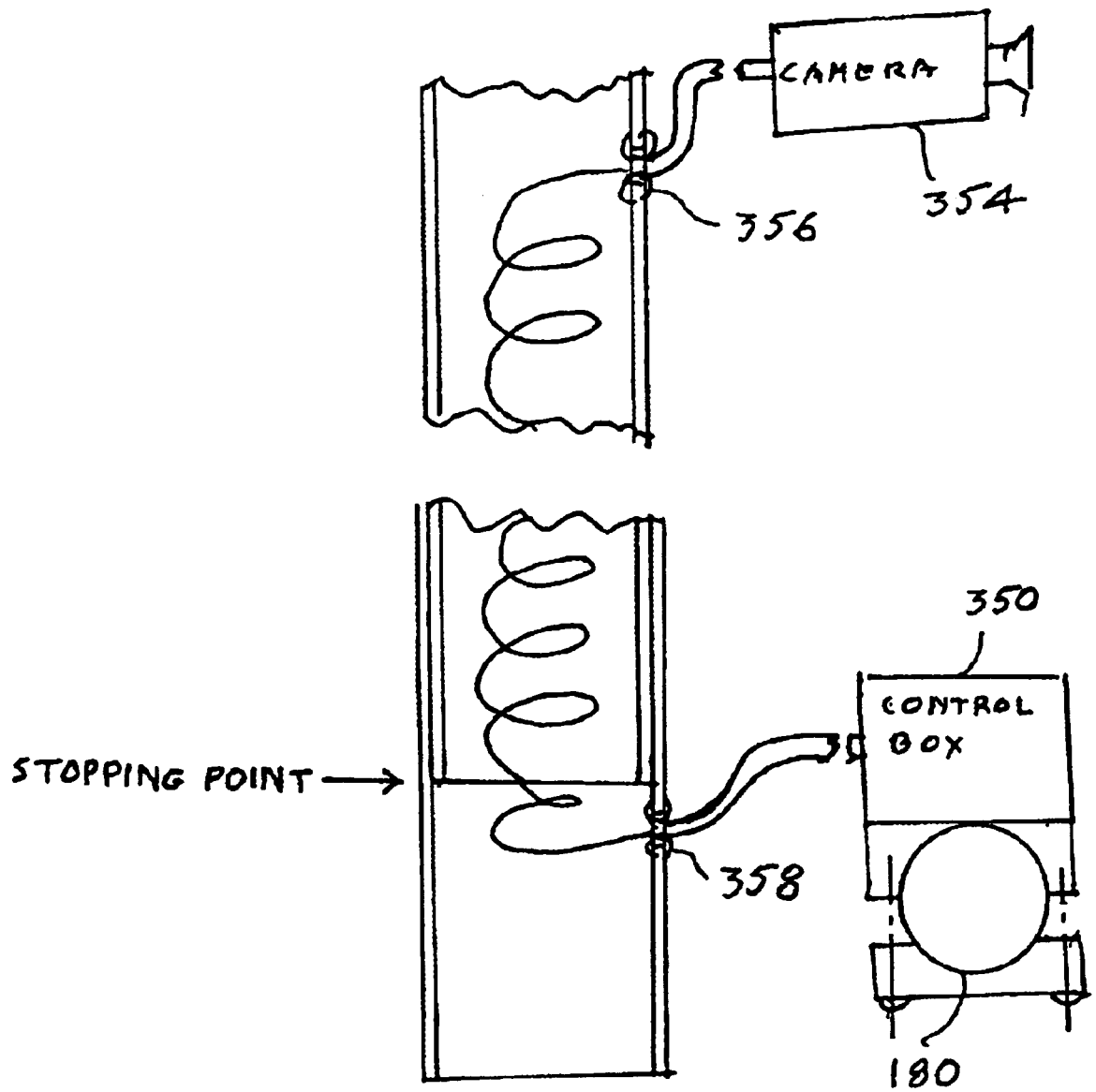
FIG. 16 is a diagrammatic view of the wiring from the control box to the camera.

Another feature of the invention is shown in FIG. 16. A camera control box 350 is attached to the support handle 180. Camera control cable 352 is attached and runs between the camera 354 and the control box 350. The control cable 352 is extensible at least in the portion within the mast, preferably configured as a spiral winding inside the mast sections. It enters the mast near the top through a grommet 356 and extends to the lowest mast section exiting through a grommet 358. It is important that the lower exit point be below the stopping point of the mast section telescoped inside so as to not damage the cable. The cable may also include a signal output line from the camera to a monitor or a storage medium or even a direct broadcast system. A monitor is preferably mounted on the mast so that the user can monitor and control the camera.

As will be appreciated, the preferred embodiment provides two states of the control assembly 22. In one state the spools 190 and 192 rotate together, but because the lines are wound on them oppositely, one winds up and the other unwinds. The one that winds up is in tension and causes tilting of the camera. In this first state, with the apparatus described above, the disc brake is applied. The second state exists when the disc brake is released allowing the spools to rotate freely and independently. The second state is used for erection and collapsing of the masts so that during erection the spools will both unwind until the desired height is set and during collapse the spools will be wound by hand. However another embodiment can be implemented that omits the entire brake structure as well as the availability of independent rotation of the spools, in other words the second state is omitted and the apparatus is constructed so that the spools and the tilt handle are permanently fixed for rotation, that is, only the first state is available. While this configuration will lose the convenience of winding the lines during collapse and unwind during erection but provides a simpler and less expensive unit. It requires that while collapsed the lines have to be gathered and when erection is desired the lines have to be installed on the spools.

While the novel features and preferred embodiments of the invention have been shown and described above and are also pointed out in the claims, the invention is not intended to be limited to the details above since it will be understood that various changes in the forms and details of the device illustrated and in its operation can be made by those skilled in the art without departing in any way from the spirit of the invention as well as by equivalents thereof by means of insubstantial changes.

What is claimed is:

1. A camera elevating, support and control apparatus comprising;
    an extensible mast having telescoping sections and having a top end and a bottom end and an operating location in a region above the bottom end convenient for an operator to reach;
    a camera mounting and control response assembly proximate the top end of the mast said assembly comprising;
        a mounting element having a pivot mount attached to the mast proximate its top end the pivot mount defining a horizontal pivot axis;
        a tilt plate pivotably mounted to said mounting element pivot mount for pivoting around said horizontal axis said tilt plate having a camera support element for attaching a camera to the tilt plate to allow a camera to be mounted on the tilt plate so that the center of gravity is below the horizontal pivot axis so that the tilt plate will tend to a rest position; and
        an integral rotator member, located only on one side of a vertical axis running through the middle of the mast, attached to said tilt plate for controlled pivoting of the tilt plate the rotator member having first and second line pulling points on opposite sides of a vertical line through the horizontal pivot axis;
    a control assembly mounted on the mast at the operating location comprising first and second spools rotatable together about a horizontal axis; and
    first and second lines extending from opposite side of the rotator member, the first line extending from the first line pulling point to the first spool for take-up by clockwise rotation of the first spool and the second line extending from the second line pulling point to the second spool for take-up by counter clockwise rotation of the second spool;
    whereby the tilt plate can be tilted about the horizontal pivot axis by rotating the spools in either direction to wind the line on one spool while the line on the other spool unwinds to tilt the tilt plate to a selected tilt angle about the horizontal pivot axis and a camera mounted on the tilt plate will be similarly tilted.

2. The apparatus of claim 1 in which said rotator member is a pulley wheel having a groove and the lines are attached to extend in opposite directions in the groove of the pulley wheel.

3. The apparatus of claim 1 in which the control assembly further includes a releasable brake device that has an engaged position to establish a first state in which the spools will rotate together for tilting the tilt plate and a disengaged position to establish a second state in which the spools can rotate independently of each other so that upon erection and collapse of the extensible mast the lines can be unwound or wound about their respective spools as the erection or collapse is performed.

4. The apparatus of claim 1 wherein the control assembly further comprises a grip element to enable rotation of the mast about its longitudinal axis.

5. The apparatus of claim 1 further comprising a foot assembly at the bottom end having a first member contactable with the ground when the apparatus is in use and a second member rotatable with respect to the first member and attached for rotation with the mast.

6. The apparatus of claim 1 further comprising control devices comprising an electronic control box mounted on the control assembly for operation by the user of the camera and an extensible cable having a control line inside it running inside the mast from the control box to the camera, the control line entering the mast at a point below the stopping point of the telescoping mast sections and exiting the mast near the top end to plug into the camera.

7. The apparatus of claim 6 further wherein a signal output line is included in the extensible cable and runs from the camera to a monitor.

8. The apparatus of claim 1 further comprising a camera mounted on the tilt plate.

9. The apparatus of claim 1 further wherein the tilt plate has an array of holes to allow positioning of a camera with a desired orientation when the lines are in neutral position.

10. The apparatus of claim 9 further comprising a camera mounted on the tilt plate through a selected one of the holes.

11. The apparatus of claim 1 further comprising a handle on the control assembly for rotating the spools.

12. The apparatus of claim 1 wherein said pivot mount is on a yoke that is offset to the side of the vertical axis and the tilt plate has a base member on which a camera may be mounted and the base member is generally over the vertical axis.

13. The apparatus of claim 12 wherein the base member has an array of holes to facilitate mounting a camera.

14. A camera elevating, support and control apparatus comprising;
an extensible mast having telescoping sections and having a top end and a bottom end and an operating location in a region above the bottom end convenient for an operator to reach;
a camera mounting and control response assembly proximate the top end of the mast said assembly comprising;
a yoke attached to the mast proximate its top end having a mounting element having a pivot mount defining a horizontal pivot axis;
a tilt plate pivotably mounted to said yoke for pivoting around said horizontal pivot axis said tilt plate having a camera support element to allow a camera to be mounted on the tilt plate so that the center of gravity is below the horizontal pivot axis so that the tilt plate will tend to a rest position; and
a pulley wheel having a groove attached to said tilt plate for controlled pivoting of the tilt plate the pulley wheel; having its center aligned with the horizontal pivot axis so that rotation of the pulley wheel will rotate the tilt plate about the horizontal pivot axis;
a control assembly mounted on the mast at the operating location comprising first and second spools rotatable together about a horizontal axis and further comprising a releasable brake device operable upon the first and second spools that has an engaged position to establish a first state in which the spools will rotate together for tilting the tilt plate and a disengaged position to establish a second state in which the spools can rotate independently of each other so that upon erection and collapse of the extensible mast the lines can be unwound or wound about their respective spools as the erection or collapse is performed; and
first and second lines, the first line fixed to the pulley wheel and fitted in the pulley wheel groove on one side above a horizontal line through the pivot axis and wound on the first spool in one direction and the second line fixed to the pulley wheel and fitted in the pulley wheel groove on the opposite side above a horizontal line through the pivot axis and wound in the opposite direction on the second spool;
whereby when the brake device is engaged the tilt plate can be tilted about the horizontal pivot axis by rotating the spools in either direction to wind the line on one spool while the line on the other spool unwinds to rotate the pulley wheel and thereby to tilt the tilt plate to a selected tilt angle about the horizontal pivot axis and a camera mounted on the tilt plate will be similarly tilted.

15. The apparatus of claim 12 further comprising control devices comprising an electronic control box mounted on the control assembly for operation by the user of the camera and an extensible control line run inside the mast from the control box to the camera, the control line entering the mast at a point below the stopping point of the telescoping mast sections and exiting the mast near the top end to plug into the camera.

16. The apparatus of claim 14 wherein the control assembly further comprises a grip element to enable rotation of the mast about its longitudinal axis.

17. The apparatus of claim 14 further comprising a foot assembly at the bottom end having a first member contactable with the ground when the apparatus is in use and a second member rotatable with respect to the first member and attached for rotation with the mast.

18. The apparatus of claim 14 wherein the extensible mast defines a vertical axis and said pivot mount is on a yoke that is offset to the side of the vertical axis and the tilt plate has a base member on which a camera may be mounted and the base member is generally over the vertical axis.

19. The apparatus of claim 18 wherein the base member has an array of holes to facilitate mounting a camera.

20. A method for elevating and controlling a camera comprising;
providing an extensible mast having telescoping sections that can be collapsed to a shortest length and erected to a desired height up to a maximum available height;
providing an apparatus at a top end of the mast to allow a camera mounted thereon to tilt about a horizontal pivot axis and an integral rotator member, located only on one side of a vertical axis running through the middle of the mast, operable to cause the tilting by rotating;
providing a first spool and a second spool at a convenient operating location on the mast, the first and second spools being rotatable together;
providing a first line attached to the rotator member operable to rotate it in one direction by tension on the first line and thereby to tilt the camera in one tilt direction and providing a second line attached to the rotator member to rotate it in the opposite direction by tension on the second line and thereby to tilt the camera in an opposite tilt direction;
winding the first line in one direction about the first spool and winding the second line in the opposite direction about the second spool; and
tilting the camera as desired by rotating the spools together to pull on one of the first or second lines thereby to tilt the camera.

21. The method of claim 20 further comprising;

providing a brake device having an engaged condition to cause a first state in which the spools rotate together to operate tilting of the camera and having a disengaged condition to cause a second state in which the spools rotate independently so that upon erection the lines can be unwound from the spools by allowing them to rotate in opposite directions and upon collapse the lines can be unwound from the spools by allowing them to rotate in opposite directions and upon collapse the lines can be wound on the spools by rotating them in opposite directions.

* * * * *